United States Patent
Maruyama

(10) Patent No.: US 9,524,379 B2
(45) Date of Patent: Dec. 20, 2016

(54) SECURITY CHIP USED IN A CONTENTS DATA PLAYING DEVICE, UPDATE MANAGEMENT METHOD, AND UPDATE MANAGEMENT PROGRAM

(71) Applicant: FUJITSU LIMITED, Kawasaki-shi (JP)

(72) Inventor: Hidefumi Maruyama, Mishima (JP)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 13/860,624

(22) Filed: Apr. 11, 2013

(65) Prior Publication Data

US 2013/0227538 A1    Aug. 29, 2013

Related U.S. Application Data

(63) Continuation of application No. PCT/JP2010/068072, filed on Oct. 14, 2010.

(51) Int. Cl.
  G06F 21/10    (2013.01)
  G06F 9/445    (2006.01)
  G06F 21/57    (2013.01)

(52) U.S. Cl.
  CPC ............... G06F 21/10 (2013.01); G06F 8/65 (2013.01); G06F 21/572 (2013.01); *G06F 2221/2137* (2013.01)

(58) Field of Classification Search
  CPC ............... G06F 21/10; G06F 8/65; G06F 8/71
  (Continued)

(56) References Cited

U.S. PATENT DOCUMENTS 5,982,891 A    11/1999  Ginter et al.
8,977,783 B2 *   3/2015  Hahn ................ G06F 17/30038
                                                710/13
(Continued)

FOREIGN PATENT DOCUMENTS

CN    1186298 A    7/1998
CN    1361530 A    7/2002
(Continued)

OTHER PUBLICATIONS

Real-time DVB-MHP to Blu-ray system information transcoding, Mai et al, IEEE Transactions on Consumer Electronics, vol. 54, Issue: 2, May 2008.*

(Continued)

*Primary Examiner* — Luu Pham
*Assistant Examiner* — Jahangir Kabir
(74) *Attorney, Agent, or Firm* — Fujitsu Patent Center

(57) ABSTRACT

A security chip is used in a contents data playing device. The security chip includes a storage unit configured to store firmware data including a firmware program, and a firmware update management unit configured to determine whether an update process is to be executed on the firmware data based on a comparison between expiration information set for the firmware data and time information received via a network, in response to a request input to the security chip to acquire a contents key or to decrypt contents data, and to reject the request when the update process is to be executed. The firmware program causes the security chip to function as a contents key acquisition control unit configured to acquire, via the network, the contents key for decrypting the contents data, and a decryption unit configured to decrypt the contents data by using the contents key.

9 Claims, 17 Drawing Sheets

(58) Field of Classification Search
USPC .................. 713/189, 191, 193, 194; 717/168
See application file for complete search history.

(56) References Cited

U.S. PATENT DOCUMENTS

| | | | |
|---|---|---|---|
| 2004/0098579 A1 | 5/2004 | Nakano et al. | |
| 2005/0144468 A1 | 6/2005 | Northcutt et al. | |
| 2005/0195975 A1* | 9/2005 | Kawakita .............. | H04L 9/0822 380/30 |
| 2007/0033419 A1* | 2/2007 | Kocher et al. ................ | 713/193 |
| 2008/0027602 A1* | 1/2008 | Yeap ....................... | B60R 25/04 701/31.4 |
| 2008/0178171 A1 | 7/2008 | Sueyoshi et al. | |
| 2010/0317401 A1* | 12/2010 | Lee et al. ...................... | 455/557 |
| 2011/0067117 A1* | 3/2011 | Nagumo ............... | G06F 21/105 726/30 |
| 2011/0072423 A1* | 3/2011 | Fukata ......................... | 717/172 |
| 2012/0124567 A1* | 5/2012 | Landry ......................... | 717/168 |
| 2012/0284522 A1* | 11/2012 | Lewis ................ | H04L 63/0435 713/181 |

FOREIGN PATENT DOCUMENTS

| | | | |
|---|---|---|---|
| CN | 1547718 | A | 11/2004 |
| CN | 1722049 | A | 1/2006 |
| CN | 1779659 | A | 5/2006 |
| CN | 101040265 | A | 9/2007 |
| JP | 2003-115838 | | 4/2003 |
| JP | 2005-148840 | | 6/2005 |
| JP | 2006-074505 | | 3/2006 |
| JP | 2008-181228 | | 8/2008 |
| JP | 2010-097502 | | 4/2010 |
| WO | 2006/044749 | A2 | 4/2006 |

OTHER PUBLICATIONS

A Framework for Self-Verification of Firmware Updates over the Air in Vehicle ECUs, Nilsson et al, GLOBECOM Workshops, 2008 IEEE.*

Extended European Search Report dated Jan. 3, 2014 for corresponding European Application No. 10858408.7.

International Search Report, mailed in connection with PCT/JP2010/068072 and mailed Nov. 22, 2010.

Chinese Office Action mailed Dec. 31, 2014 for corresponding Chinese Patent Application No. 2014122601476760, with Partial English Translation, 23 pages.

Chinese Office Action mailed Dec. 31, 2014 for corresponding Chinese Patent Application No. 201080069584.8, with Partial English Translation, 23 pages.

Chinese Office Action mailed on Feb. 3, 2016 for corresponding Chinese Patent Application No. 201080069584.8, with English Translation, 15 pages.

Chinese Office Action dated Sep. 30, 2015 for corresponding Chinese Patent Application No. 201080069584.8, with English Translation, 21 pages.

* cited by examiner

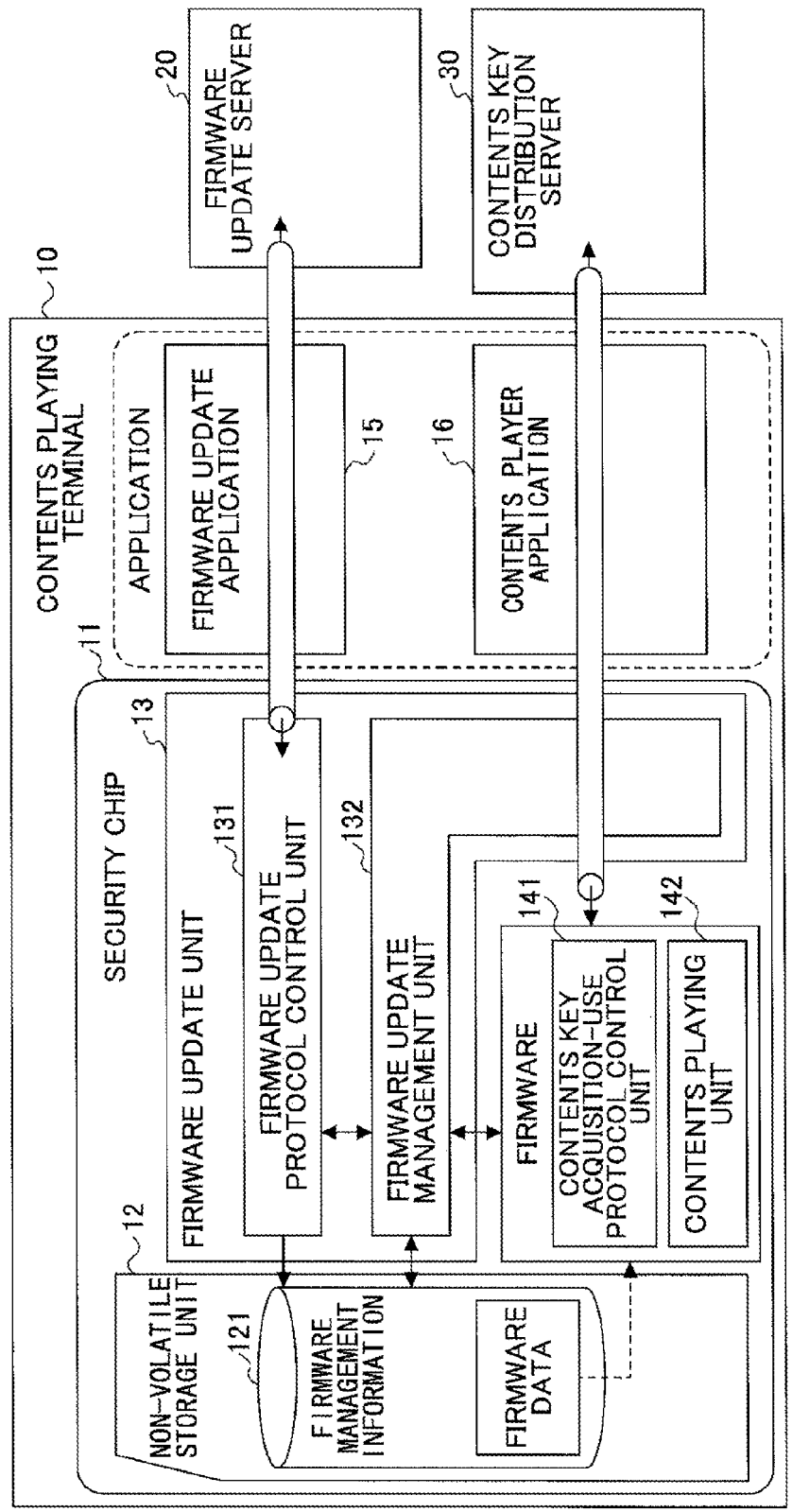

FIG.3

| | |
|---|---|
| NEXT UPDATE CHECK DATE (UTC TIME) | 8 BYTES |
| LAST SERVER CHECK DATE (UTC TIME) | 8 BYTES |
| FIRMWARE ID (BINARY) | 16 BYTES |
| FIRMWARE VERSION NUMBER (POSITIVE INTEGER) | 8 BYTES |
| FIRMWARE UPDATE STATE IN THE PROCESS OF UPDATING:0x01 UPDATE COMPLETED:0x00 | 1 BYTE |
| SIZE OF FIRMWARE UPDATE-USE ROOT PUBLIC KEY CERTIFICATE (NUMBER OF BYTES) | 4 BYTES |
| FIRMWARE UPDATE-USE ROOT PUBLIC KEY CERTIFICATE | |
| SIZE OF FIRMWARE UPDATE-USE CLIENT PUBLIC KEY CERTIFICATE (NUMBER OF BYTES) | 4 BYTES |
| FIRMWARE UPDATE-USE CLIENT PUBLIC KEY CERTIFICATE (INCLUDING PKIPATH FORMAT) | |
| SIZE OF FIRMWARE UPDATE-USE CLIENT SECRET KEY (NUMBER OF BYTES) | 4 BYTES |
| FIRMWARE UPDATE-USE CLIENT SECRET KEY | |
| FIRMWARE DATA LENGTH (NUMBER OF BYTES) | 4 BYTES |
| FIRMWARE DATA<br>INCLUDES THE FOLLOWING<br> ▪ CONTENTS KEY ACQUIRING PROGRAM<br> ▪ ENCRYPTED CONTENTS DECRYPTING PROGRAM<br> ▪ CONTENTS KEY ACQUISITION-USE CLIENT DRM SECRET KEY<br> ▪ CONTENTS KEY ACQUISITION-USE CLIENT DRM PUBIC KEY CERTIFICATE (INCLUDING PKIPATH FORMAT)<br> ▪ CONTENTS KEY ACQUISITION-USE ROOT PUBIC KEY CERTIFICATE | |
| SIZE OF ELECTRONIC SIGNATURE OF FIRMWARE DATA (NUMBER OF BYTES) | |
| ELECTRONIC SIGNATURE OF FIRMWARE DATA | |
| PUBLIC KEY CERTIFICATE OF FIRMWARE UPDATE SERVER (INCLUDING PKIPATH FORMAT) | |

| CHIP ID (BINARY) | 16 BYTES |
|---|---|
| FIRMWARE ID (BINARY) | 16 BYTES |
| LATEST FIRMWARE VERSION NUMBER (POSITIVE INTEGER) | 8 BYTES |
| NEXT UPDATE CHECK DATE (UTC TIME) | 8 BYTES |
| FIRMWARE DATA LENGTH (NUMBER OF BYTES) | 4 BYTES |
| FIRMWARE DATA<br>INCLUDES THE FOLLOWING<br>・CONTENTS KEY ACQUIRING PROGRAM<br>・ENCRYPTED CONTENTS DECRYPTING PROGRAM<br>・CONTENTS KEY ACQUISITION-USE CLIENT DRM SECRET KEY<br>・CONTENTS KEY ACQUISITION-USE CLIENT DRM PUBIC KEY CERTIFICATE (INCLUDING PKIPATH FORMAT)<br>・CONTENTS KEY ACQUISITION-USE CLIENT DRM PUBIC KEY CERTIFICATE AUTHORITY<br>・PUBIC KEY CERTIFICATE OF CONTENTS KEY ACQUISITION-USE ROOT CERTIFICATE AUTHORITY | |

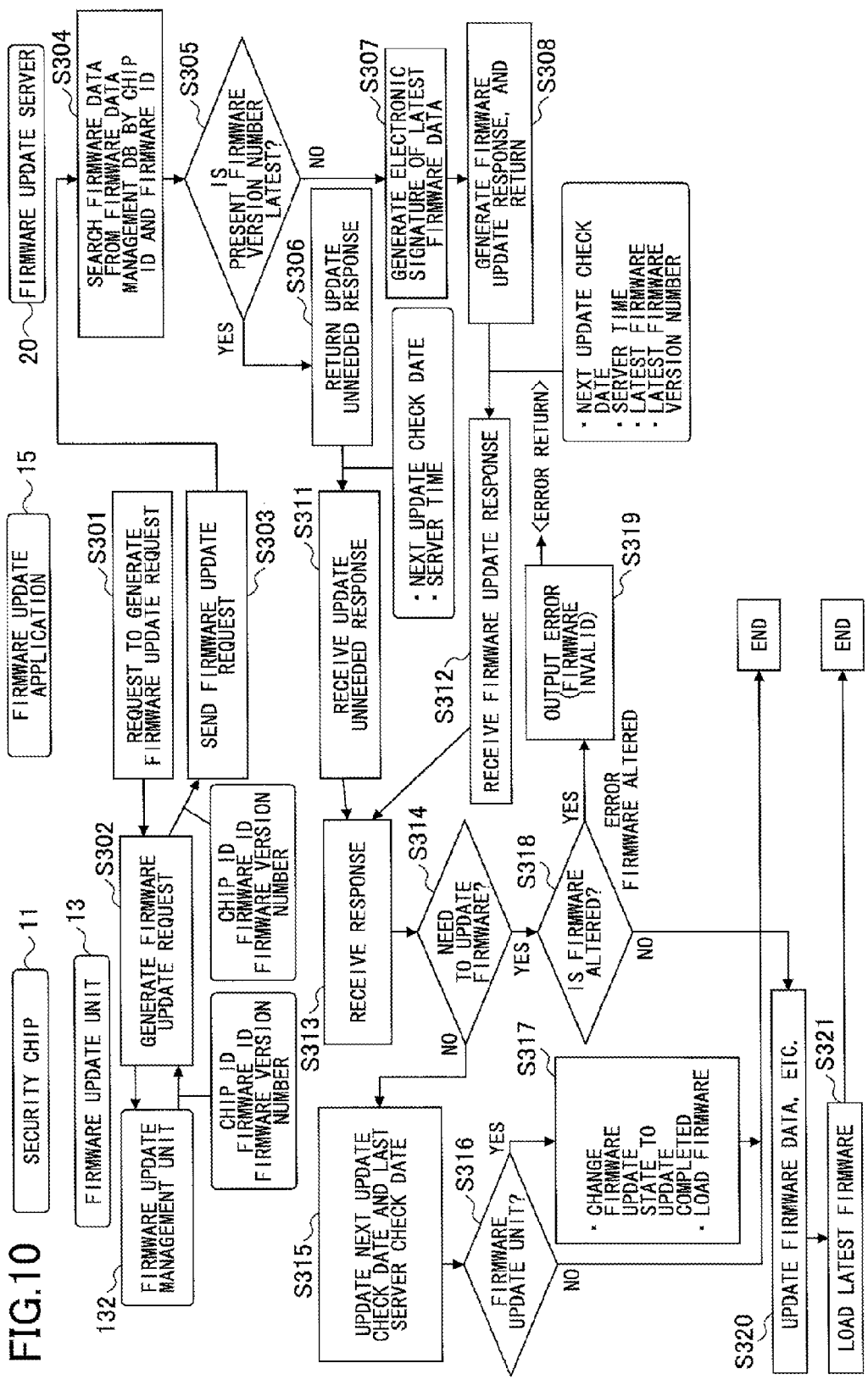

FIG.11

| No | Byte | ITEM NAME | DESCRIPTION |
|---|---|---|---|
| 1 | 0-1 | RequestID | 0x0001 INDICATE SECURE CONNECTION OPEN REQUEST |
| 2 | 2-3 | Version | 0x0001 VERSION OF PROTOCOL |
| 3 | 4-19 | ChipID | 0x00010000000000000 0100000000000001 CHIP ID |
| 4 | 20-35 | RandomNumber | RANDOM NUMBER OF CLIENT SIDE FOR EACH CONNECTION TO PREVENT MASQUERADING IN COMMUNICATION |
| 5 | 36-37 | CertificateSize | 0x0100 LENGTH OF NO. 6 |
| 6 | 38-(38+CertificateSize-1) | Certificate | FIRMWARE UPDATE-USE CLIENT PUBLIC KEY CERTIFICATE (EC-DSA,ECSP-DA,EMSA1) |

FIG.12

| No | Byte | ITEM NAME | DESCRIPTION |
|---|---|---|---|
| 1 | 0-1 | RequestID | 0x0002 INDICATE SECURE CONNECTION OPEN RESPONSE |
| 2 | 2-3 | Version | 0x0001 VERSION OF PROTOCOL |
| 3 | 4-19 | RandomNumber | RANDOM NUMBER OF SERVER SIDE FOR EACH CONNECTION TO PREVENT MASQUERADING IN COMMUNICATION |
| 4 | 20-75 | EC-DHPhavelValue | TEMPORARY PUBLIC KEY CREATED BY FIRMWARE UPDATE SERVER (EC-DH PRIME FIELD 224 BIT KEY) |
| 5 | 76-131 | Signature | VALUE OBTAINED BY COMBINING RandomNumber SENT FROM CLIENT AND ABOVE VALUE OF FOURTH ITEM, AND SIGNING THIS COMBINED VALUE WITH FIRMWARE UPDATE-USE SERVER SECRET KEY (EC-DSA + SHA256) |
| 6 | 132-133 | CertificateSize | 0x0100 LENGTH OF NO. 7 |
| 7 | 134-(134+CertificateSize-1) | Certificate | FIRMWARE UPDATE-USE SERVER PUBLIC KEY CERTIFICATE (EC-DSA, ECSP-DA, EMSA1) |

FIG.13

| No | Byte | ITEM NAME | DESCRIPTION |
|---|---|---|---|
| 1 | 0-1 | RequestID | 0x0003  INDICATE FIRMWARE UPDATE REQUEST |
| 2 | 2-3 | Version | 0x0001  VERSION OF PROTOCOL |
| 3 | 4-19 | ChipID | 0x00010000000000000 0100000000000001 CHIP ID |
| 4 | 20-75 | EC-DHPhave1Value | TEMPORARY PUBLIC KEY CREATED BY SECURITY CHIP (EC-DH PRIME FIELD 224 BIT KEY) |
| 5 | 76-131 | Signature | VALUE OBTAINED BY COMBINING RandomNumber SENT FROM SERVER AND ABOVE VALUE OF FOURTH ITEM, AND SIGNING THIS COMBINED VALUE WITH FIRMWARE UPDATE-USE CLIENT SECRET KEY (EC-DSA + SHA256) |
| 6 | 132-133 | ParameterSize | 0x0028  LENGTH OF NO. 7 - NO. 9 |
| 7 | 134-149 | ChipID | SAME VALUE AS NO. 3 |
| 8 | 150-165 | FirmID | 0x00000000000000000 0000000000000001 ID FOR UNIQUELY IDENTIFYING UPDATE TARGET FIRMWARE |
| 9 | 166-173 | FirmVersion | 0x0000000000000001  FIRMWARE VERSION NUMBER INSIDE SECURITY CHIP |

FIG.14

| No | Byte | ITEM NAME | DESCRIPTION |
|---|---|---|---|
| 1 | 0-1 | RequestID | 0x0004 INDICATE FIRMWARE UPDATE RESPONSE |
| 2 | 2-3 | Version | 0x0001 VERSION OF PROTOCOL |
| 3 | 4-5 | ParameterSize | 0x00 LENGTH OF NO. 4-NO. 9 |
| 4 | 6-13 | NextCheckDateTime | 0x00000000004B42A98F NEXT UPDATE CHECK DATE |
| 5 | 14-21 | ServerTime | 0x000000004B42A000 SERVER TIME |
| 6 | 22-29 | FirmVersion | 0x0000000000000002 VERSION NUMBER OF FIRMWARE DATA OF NO. 7-NO. 8<br>THIS VALUE IS INVALID IF VALUE OF NO. 7 IS ZERO |
| 7 | 30-33 | FirmDataSize | 0x00010008 SIZE OF NO. 8<br>THIS VALUE IS ZERO IF FIRMWARE UPDATE IS NOT NEEDED |
| 8 | 34-(34+FirmDataSize-1) | FirmData | LATEST FIRMWARE DATA<br>THIS FIELD DOES NOT EXIST IF VALUE OF NO. 7 IS ZERO |
| 9 | (34+FirmDataSize)-(65+FirmDataSize) | Digest | DIGEST OF SHA-256 FROM NO. 1 TO NO.8 |

FIG.15

| No | Byte | ITEM NAME | DESCRIPTION |
|---|---|---|---|
| 1 | 0-1 | RequestID | 0x0005 INDICATE SECURE CONNECTION CLOSE REQUEST |
| 2 | 2-3 | Version | 0x0001 VERSION OF PROTOCOL |
| 3 | 4-19 | ChipID | 0x00010000000000000 0100000000000001 CHIP ID |
| 4 | 20-21 | ParameterSize | 0x0020 LENGTH OF NO. 5 |
| 5 | 22-53 | Digest | DIGEST OF SHA-256 FROM NO. 1 TO NO.4 |

FIG.16

| No | Byte | ITEM NAME | DESCRIPTION |
|----|------|-----------|-------------|
| 1 | 0-1 | RequestID | 0x0005 INDICATE SECURE CONNECTION CLOSE REQUEST |
| 2 | 2-3 | Version | 0x0001 VERSION OF PROTOCOL |
| 3 | 20-21 | ParameterSize | 0x0024 LENGTH OF NO. 4-NO. 5 |
| 4 | 22-25 | ReturnCode | 0x00000000 RETURN CODE |
| 5 | 26-57 | Digest | DIGEST OF SHA-256 FROM NO. 1 TO NO.4 |

SECURITY CHIP USED IN A CONTENTS DATA PLAYING DEVICE, UPDATE MANAGEMENT METHOD, AND UPDATE MANAGEMENT PROGRAM

CROSS-REFERENCE TO RELATED APPLICATION

This patent application is based upon and claims the benefit of priority under 35 USC 120 and 365(c) of PCT application JP2010/068072 filed in Japan on Oct. 14, 2010, the entire contents of which are incorporated herein by reference.

FIELD

The present invention is related to a contents data playing device, an update management method, and an update management program for continuously updating firmware.

BACKGROUND

Conventionally, there are terminals for receiving contents data such as music and images via a line, and playing the contents (hereinafter, "contents playing terminal"). Examples of the contents playing terminal include a PC (Personal Computer), an IPTV (Internet Protocol Television), a STB (Set Top Box), and various mobile terminals having a mobile music player installed.

In order to prevent fraudulent use of contents data by a contents playing terminal, the firmware of the contents playing terminal is preferably periodically updated. This is because the firmware includes a secret key for realizing secure communication to safely acquire a decryption key of the contents. That is to say, when secure communication is performed for a long period of time based on the same secret key, etc., in theory, the communication contents are likely to be hacked. Therefore, generally, the firmware of the contents playing terminal is operated to be periodically updated. As a result, the above secret key is updated, and safety of secure communication is continuously ensured.

FIG. 1 is for describing an update function of firmware in a conventional contents playing terminal.

In FIG. 1, a contents playing terminal 510 includes a security chip 511. The security chip 511 includes a firmware update unit 512 and firmware 513 that is the update target, etc.

Furthermore, the contents playing terminal 510 includes, as application programs executed by a CPU outside the security chip 511, a firmware update application 514 and a contents player application 515, etc.

The firmware update application 514 is an application program for downloading firmware from a firmware update service 520, and causing the firmware update unit 512 to execute updating of the firmware 513.

The contents player application 515 is an application program for playing contents data downloaded from a contents distribution service 530, with the use of the firmware 513, etc.

The firmware update service 520 is a service for providing firmware via a network. The firmware update service 520 is generally operated by the manufacturer of the contents playing terminal 510.

The contents distribution service 530 is a service for distributing contents data via a network.

The updating of the firmware 513 of the contents playing terminal 510 described above is executed by, for example, the following procedures.

For example, when an instruction to update the firmware 513 is input, the firmware update application 514 calls the firmware update unit 512 of the security chip 511, and acquires the version number (firmware version number) of the firmware 513 at the present time point (S1)

Next, the firmware update application 514 specifies the acquired firmware version number, and sends a firmware update request to the firmware update service 520 (S2).

The firmware update service 520 compares the firmware version number sent from the firmware update application 514 with the latest firmware version number, and if the former is older, the firmware update service 520 returns data (firmware data) including the latest firmware 513 (S3). Furthermore, regardless of whether the latest firmware is returned, the firmware update service 520 returns the next firmware update date. The next firmware update date is management information for periodically sending a firmware update request, and a date that is a certain period after the present time point is specified as the next firmware update date.

When firmware data is returned from the firmware update service 520, the firmware update application 514 inputs the firmware data in the firmware update unit 512 of the security chip 511, and requests to update the firmware 513 (S4). Furthermore, the firmware update application 514 records the next firmware update date that has been returned in a predetermined non-volatile area.

The firmware update unit 512 updates the firmware 513 inside the security chip 511 based on the input firmware data (S5).

It is detected that the firmware 513 updated as described above needs to be updated, and the detection is reported to the user, as described below.

When an instruction to play contents data is input to the contents player application 515, the contents player application 515 determines whether the present time (terminal time) of the contents playing terminal 510 has reached the next firmware update date. When the terminal time has reached the next firmware update date, an error indicating that the firmware 513 needs to be updated is output.

When the error is output, the playing of the contents data is not executed. Therefore, in order to cause the contents playing terminal 510 to execute the playing of the contents data, the user has to cause the contents playing terminal 510 to execute the process of step S501 and onward.

Patent Document 1: Japanese Laid-Open Patent Publication No. 2008-181228

Patent Document 2: Japanese Laid-Open Patent Publication No. 2005-148840

However, by the above mechanism, the coercive force with respect to the updating of the firmware is very weak.

That is to say, by the above mechanism, the contents player application 515 refuses to play the contents data according to the comparison between the terminal time and the next update date, so that the coercive force with respect to the updating of the firmware 513 is ensured. However, the contents player application 515 is recorded in a storage medium that may be easily altered, compared to a security chip. Therefore, there has been a possibility that the contents player application 515 is altered so that execution of playing of the contents data is possible even if the terminal time has reached the next update date.

Furthermore, the terminal time that is compared with the next firmware update date may be easily changed by the user's operation. Therefore, for example, by returning the terminal time to a past time when playing the contents data, the check mechanism of comparing the terminal time with the next firmware update date may be practically invalidated.

If a clock is provided inside the security chip 510, the time may be prevented from being changed. However, such a security chip 510 will be expensive and unrealistic.

SUMMARY

According to an aspect of the embodiments, a security chip used in a contents data playing device is provided, wherein the security chip includes a storage unit configured to store firmware data including a firmware program, and a firmware update management unit configured to determine whether an update process is to be executed on the firmware data based on a comparison between expiration information set for the firmware data and time information received via a network, in response to a request input to the security chip to acquire a contents key or to decrypt contents data, and to reject the request when the update process is to be executed, wherein the firmware program causes the security chip to function as a contents key acquisition control unit configured to acquire, via the network, the contents key for decrypting the contents data, and a decryption unit configured to decrypt the contents data by using the contents key.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF DRAWINGS

FIG. 2 illustrates an example of a functional configuration of a contents playing terminal according to an embodiment of the present invention.

FIG. 3 illustrates an example of the configuration of firmware management information.

FIG. 9 illustrates an example of a configuration of a firmware data management DB.

FIG. 10 is a flowchart for describing an example of processing procedures of a process of updating firmware data.

FIG. 11 illustrates an example of the configuration of a secure connection open request.

FIG. 12 illustrates an example of a configuration of a secure connection open response.

FIG. 13 illustrates an example of a configuration of a firmware update request.

FIG. 14 illustrates an example of a configuration of a firmware update response.

FIG. 15 illustrates an example of a configuration of a secure connection close request.

FIG. 16 illustrates an example of a configuration of a secure connection close response.

DESCRIPTION OF EMBODIMENTS

Figure 1:
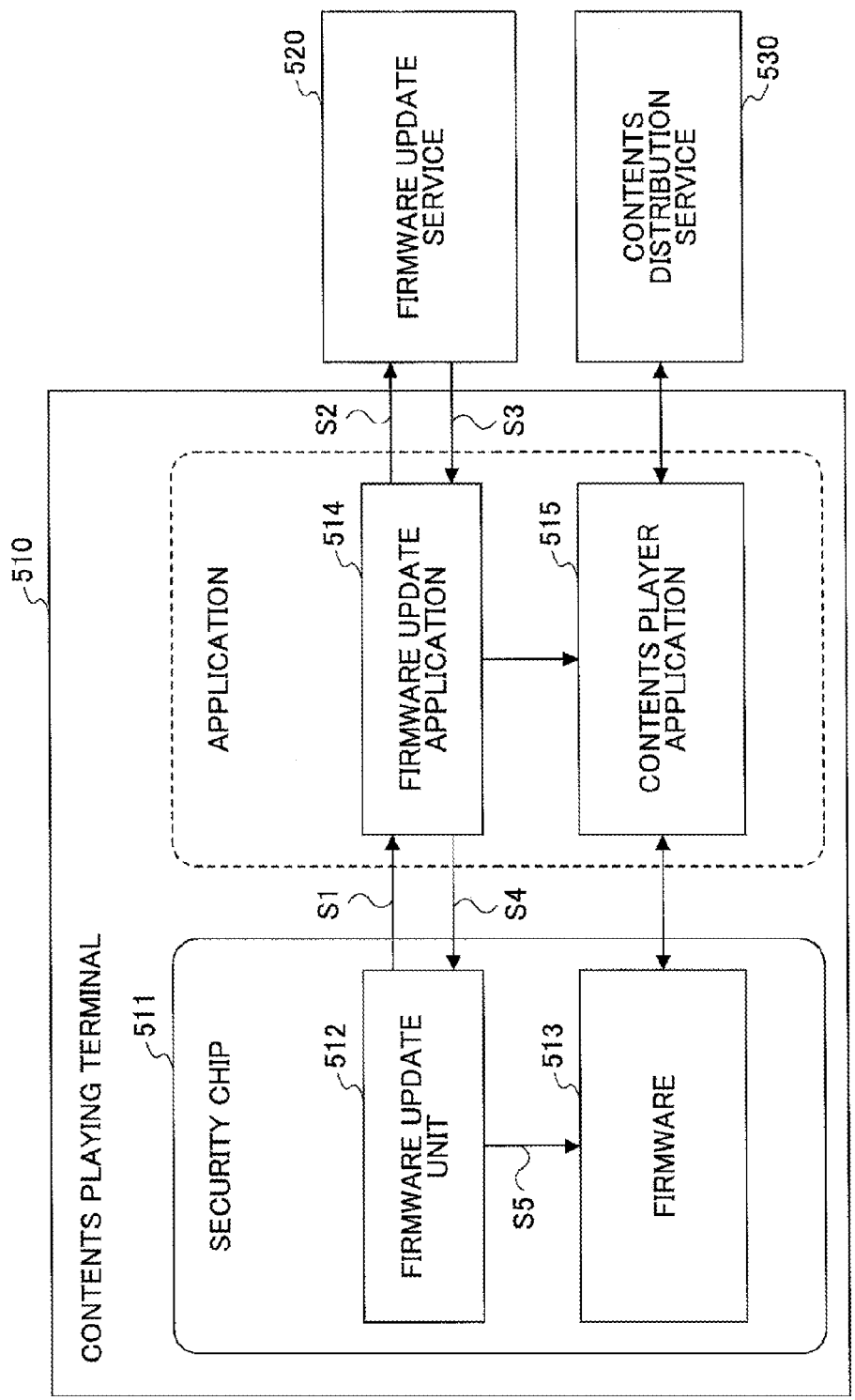
FIG. 1 is for describing an update function of firmware in a conventional contents playing terminal.

In the following, embodiments of the present invention are described with reference to drawings. FIG. 2 illustrates an example of a functional configuration of a contents playing terminal according to an embodiment of the present invention.

A contents playing terminal 10 is an information processing apparatus for receiving contents data via a network and playing the contents data (example of contents playing device). Examples of the contents playing terminal 10 include a PC (Personal Computer), an IPTV (Internet Protocol Television), a STB (Set Top Box), various mobile terminals having a mobile music player installed, and a playing device of an electronic book.

In FIG. 2, the contents playing terminal 10 includes a security chip 11. The security chip 11 is, for example, an LSI in compliance with TPM (Trusted Platform Module) that is a specification formulated by TCG (Trusted Computing Group). Therefore, it is very difficult to refer to information recorded in the security chip 11 from outside. Thus, the information recorded in the security chip 11 is very unlikely to be altered.

In FIG. 2, the security chip 11 includes a non-volatile storage unit 12 and a firmware update unit 13, etc. The non-volatile storage unit 12 is a storage area in a non-volatile storage medium inside the security chip 11. The non-volatile storage unit 12 is an example of a storage unit and an update state storage unit, and stores firmware management information 121, etc. The firmware management information 121 includes information for appropriately updating firmware data, and firmware data, etc. Firmware data is data storing various programs and various kinds of data as firmware.

FIG. 3 illustrates an example of the configuration of firmware management information. In FIG. 3, the firmware management information 121 includes the next update check date, a last server check date, a firmware ID, a firmware version number, a firmware update state, a size of a firmware update-use root public key certificate, a firmware update-use root public key certificate, a size of a firmware update-use client public key certificate, a firmware update-use client public key certificate, a size of a firmware update-use client secret key, a firmware update-use client secret key, a firmware data length, firmware data, a size of an electronic signature of firmware data, an electronic signature of firmware data, and a public key certificate of a firmware update server. The data sizes (numbers of bytes) of the respective items in FIG. 3 are examples.

The next update check date is an example of expiration information set in the firmware data. Specifically, the next update check date is the date (for example, UTC time) indicating the expiration date of the authorization for using the contents data even when a firmware data update request (request to confirm whether update is needed) is not executed with respect to a firmware update server 20. That is to say, when the next update check date has passed, and a firmware data update request is not executed, playing of contents data is rejected. The next update check date is updated in response to a firmware data update request. That is to say, in response to the update request, a new value (date) is returned from the firmware update server 20. In the initial state of the security chip 11 (that is to say, the state before starting to use the contents playing terminal 10), as the value of the next update check date, for example, an appropriate initial value such as 0 (zero) is to be set. In a case where the value of the next update check date is an initial value, if the firmware data update request is not executed, the firmware data is prohibited from being loaded in the memory. The firmware data may not always be updated in response to a firmware data update request. If the firmware data in the contents playing terminal 10 is the latest version, the firmware data is not updated.

A last server check date is an example of time information received via a network. Specifically, the last server check date is the date (for example, a UTC time) when the contents playing terminal 10 most recently accessed the firmware update server 20 or a contents key distribution server 30. That is to say, when the contents playing terminal 10 accesses the firmware update server 20 or the contents key distribution server 30, the last server check date is updated to the date of the access. As this date, a value returned from the firmware update server 20 or the contents key distribution server 30 is used. That is to say, this date is not a value indicated by the clock of the contents playing terminal 10.

The firmware ID is identification information for identifying the type of firmware (firmware data).

The firmware version number is the version number of the firmware data presently installed in the contents playing terminal 10.

The firmware update state indicates the state of the firmware data update process, which is updated in the process of the update process. Specifically, when the update process starts, the firmware update state is updated to "in the process of updating", and when the update process ends, the firmware update state is updated to "update completed". In the present embodiment, 0x01 indicates "in the process of updating", and 0x00 indicates "update completed".

The size of a firmware update-use root public key certificate is the data size (number of bytes) of the firmware update-use root public key. The firmware update-use root public key certificate is a public key certificate of a root certificate authority, used for establishing secure communication (encrypted communication) for updating (transferring) firmware data.

The size of a firmware update-use client public key certificate is the data size (number of bytes) of the firmware update-use client public key certificate. The firmware update-use client public key certificate is a public key certificate for the security chip 11, used for establishing secure communication for updating (transferring) firmware data.

The size of a firmware update-use client secret key is the data size (number of bytes) of the firmware update-use client secret key. The firmware update-use client secret key is a secret key for the security chip 11, used for establishing secure communication for updating (transferring) firmware data.

The firmware data length is the data size (number of bytes) of the firmware data. The firmware data is the entity of the firmware data.

The size of the electronic signature of the firmware data is the data size (number of bytes) of the electronic signature of the firmware data. The electronic signature of the firmware data is the electronic signature for the firmware data, and is generated by the firmware update server 20. The public key certificate of a firmware update server is a public key certificate for examining the electronic signature of the firmware data.

As illustrated in FIG. 3, the firmware data includes a contents key acquiring program, an encrypted contents decrypting program, a contents key acquisition-use client DRM secret key, a contents key acquisition-use client DRM public key certificate, and a contents key acquisition-use root public key certificate.

The contents key acquiring program is a program that is loaded in the RAM inside the security chip 11, and that causes the security chip 11 to function as a contents key acquisition protocol control unit 141. The contents key acquisition protocol control unit 141 is an example of a contents key acquiring control unit. For example, the contents key acquisition protocol control unit 141 controls the acquiring process (download) of acquiring a decryption key for contents data (hereinafter, "contents key") from the contents key distribution server 30 performed by a contents player application 16.

The encrypted contents decrypting program is a program that is loaded in a RAM 1002 inside the security chip 11, and that causes the security chip 11 to function as a contents playing unit 142. The contents playing unit 142 is an example of a decrypting unit. For example, the contents playing unit 142 executes the decryption, the playing, etc., of the contents data in response to a request from the contents player application 16.

The contents key acquisition-use client DRM secret key is a secret key of the security chip 11, which is used by the contents key acquisition protocol control unit 141 for establishing secure communication. The contents key acquisition-use client DRM public key certificate is a public key certificate for the security chip 11, which is used by the contents key acquisition protocol control unit 141 for establishing secure communication. The contents key acquisition-use root public key certificate is a public key certificate for a root certificate authority, which is used by the contents key acquisition protocol control unit 141 for establishing secure communication.

Referring back to FIG. 2, the firmware update unit 13 executes a process of updating firmware data. The firmware update unit 13 includes a firmware update protocol control unit 131 and a firmware update management unit 132.

The firmware update protocol control unit 131 makes the communication secure for an acquiring process (download) of acquiring firmware data, etc. from a firmware update server performed by a firmware update application 15, and updates existing firmware data with the downloaded firmware data.

The firmware update management unit 132 determines whether the firmware data needs to be updated based on the firmware management information 121. The firmware update unit 13 is a virtual processing unit by which a program other than firmware is realized by a process executed by the CPU of the security chip 11. As described above, in the contents playing terminal 10 according to the present embodiment, in the security chip 11, there is provided a function for executing the updating of firmware data in a secure manner.

In a recording medium other than the security chip 11 of the contents playing terminal 10, application programs are installed, such as the firmware update application 15 and the contents player application 16, etc. The firmware update application 15 executes the updating of firmware data with the use of the firmware update protocol control unit 131, etc., in response to input of an instruction to update firmware data. The contents player application 16 uses the contents key acquisition protocol control unit 141 or the contents playing unit 142, etc., of the security chip 11 to execute the downloading of a contents data key or the playing of the contents data. However, before playing the contents data, the contents player application 16 inquires whether the firmware data needs to be updated to the firmware update management unit 132. When a response is returned indicating that the firmware needs to be updated, the contents player application 16 rejects the playing of the contents data.

The firmware update server 20 is a computer for supporting the process of updating firmware data. In the firmware update server 20, the latest firmware data is stored.

The contents key distribution server 30 is a computer for storing contents keys, etc., of various contents data in association with identifiers of contents keys. The contents key distribution server 30 returns a contents key corresponding to the identifier specified in a request to acquire the contents key.

It is assumed that the firmware update server 20 and the contents key distribution server 30 respectively appropriately perform time correction of the clock of the corresponding computer by NTP (Network Time Protocol), etc. Therefore, it is assumed that the difference in time between these servers is sufficiently small (for example, less than five minutes). This assumption is made because the time indicated by the clock of the firmware update server 20 and the time indicated by the clock of the contents key distribution server 30 are used as the same parameter (last server check date), as described below.

In the following, a process of acquiring a contents key from the contents key distribution server 30, a process of playing contents data, and a process of updating firmware data are respectively described in detail. It is assumed that the encrypted contents data and the identifier of a contents key corresponding to the contents data are already downloaded to the contents playing terminal 10 and saved in a predetermined storage medium of the contents playing terminal 10. The predetermined storage medium is a storage medium that is disposed outside the security chip 11 and that may be freely accessed by the contents player application 16.

Figure 4:
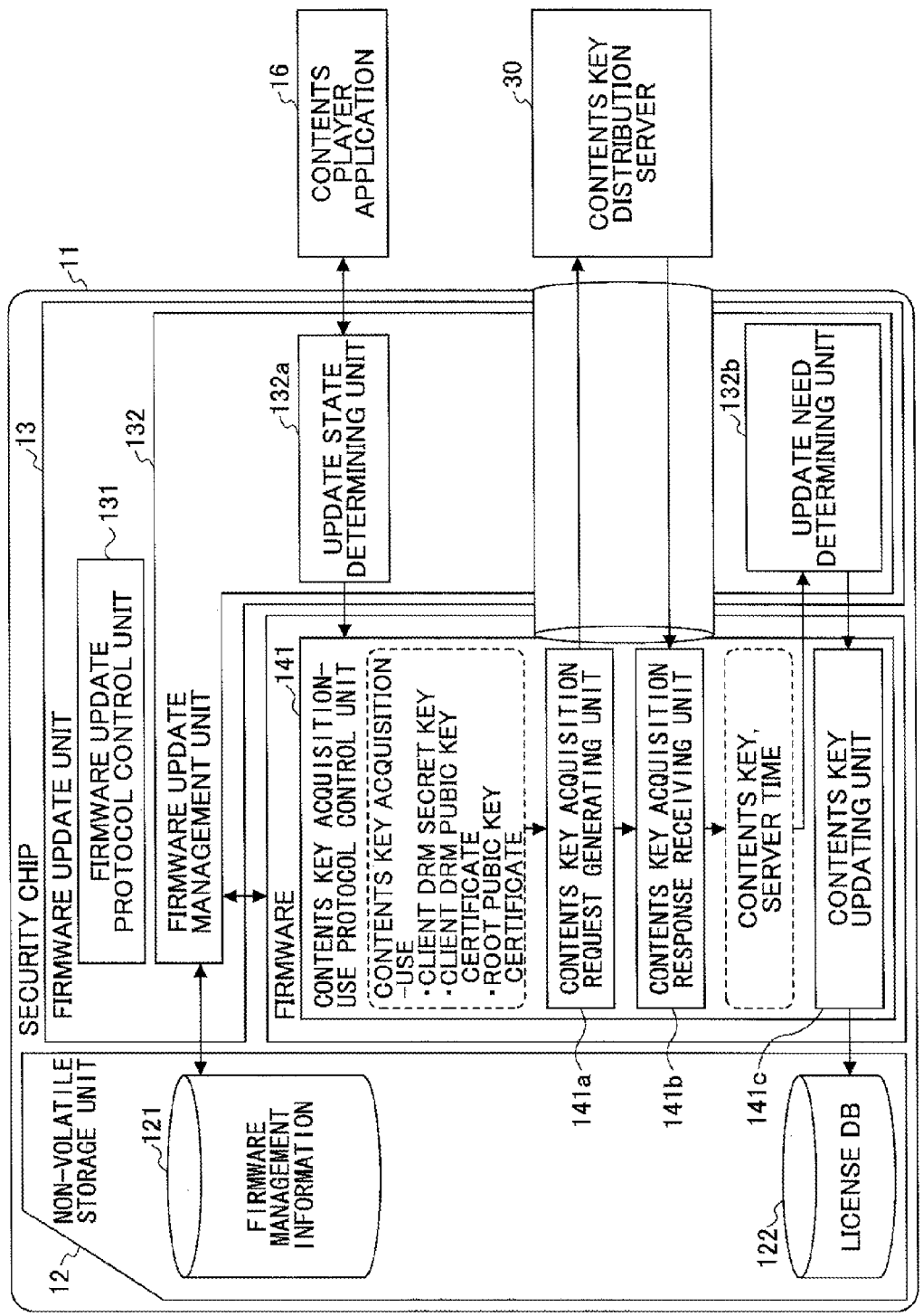
FIG. 4 illustrates an example of a functional configuration relevant to a process of acquiring a contents key from a contents key distribution server.

FIG. 4 illustrates an example of a functional configuration relevant to a process of acquiring a contents key from a contents key distribution server. The configuration elements relevant to the process of acquiring a contents key illustrated in FIG. 4 are extracted from FIG. 2. For some of the configuration elements, the function configuration is illustrated in more detail. In FIG. 4, elements corresponding to those in FIG. 2 are denoted by the same reference numerals and descriptions thereof are omitted.

For example, the firmware update management unit 132 includes an update state determining unit 132a and an update need determining unit 132b, etc. The update state determining unit 132a determines the state of the previous update process of the firmware data, based on a firmware update state included in the firmware management information 121, in response to a request to the security chip 11 from the contents player application 16. When there is no problem with the firmware update state (that is to say, when the previous update process was not interrupted), the update state determining unit 132a calls the update need determining unit 132b.

The update need determining unit 132b compares the last server check date included in the firmware management information 121 with the next update check date, to determine whether a process of updating the firmware data is to be performed. That is to say, in the present embodiment, the time indicated by the clock built in the contents playing terminal 10 is not used. Therefore, instead of the present date, the last server check date is compared with the next update check date. The last server check date is not always the present time. However, in the present embodiment, a difference between the last server check date and the present time is allowed. When an update process is not needed, the update need determining unit 132b calls the contents key acquisition protocol control unit 141.

The contents key acquisition protocol control unit 141 includes a contents key acquisition request generating unit 141a, a contents key acquisition response receiving unit 141b, and a contents key updating unit 141c, etc.

The contents key acquisition request generating unit 141a generates request data (hereinafter, "contents key acquisition request") for securely acquiring a contents key. For example, the contents key acquisition request generating unit 141a shares a temporary shared key with the contents key distribution server 30, by a PKI (Public Key Infrastructure) method. In this case, the contents key acquisition request generating unit 141a uses a contents key acquisition-use root public key certificate, a contents key acquisition-use client public key certificate, and a contents key acquisition-use client secret key, etc., included in the firmware data. The sharing of the temporary shared key is realized by a known method such as EC-DH+EC-DSA+SHA or RSA-DH+RSA-DSA+SHA. A contents key acquisition-use protocol data processing unit encrypts part of the contents key acquisition request with the temporary shared key.

The contents key acquisition response receiving unit 141b receives a response (contents key acquisition response) returned from the contents key distribution server 30 in response to the contents key acquisition request, and uses the temporary shared key to decrypt the contents key acquisition response. The contents key acquisition response includes both the contents key and the present time (hereinafter, "server time") indicated by a clock in the contents key distribution server 30. The update need determining unit 132b updates the last server check date of the firmware management information 121 with the server time, and compares the updated last server check date with the next update check date to confirm again whether the update process needs to be performed.

When the update need determining unit 132b determines that the update process is not needed based on the updated last server check date, the contents key updating unit 141c records the contents key included in the contents key acquisition response in a license DB 122 of a non-volatile storage unit. The license DB 122 stores the contents keys in association with the respective identifiers.

Figure 5:
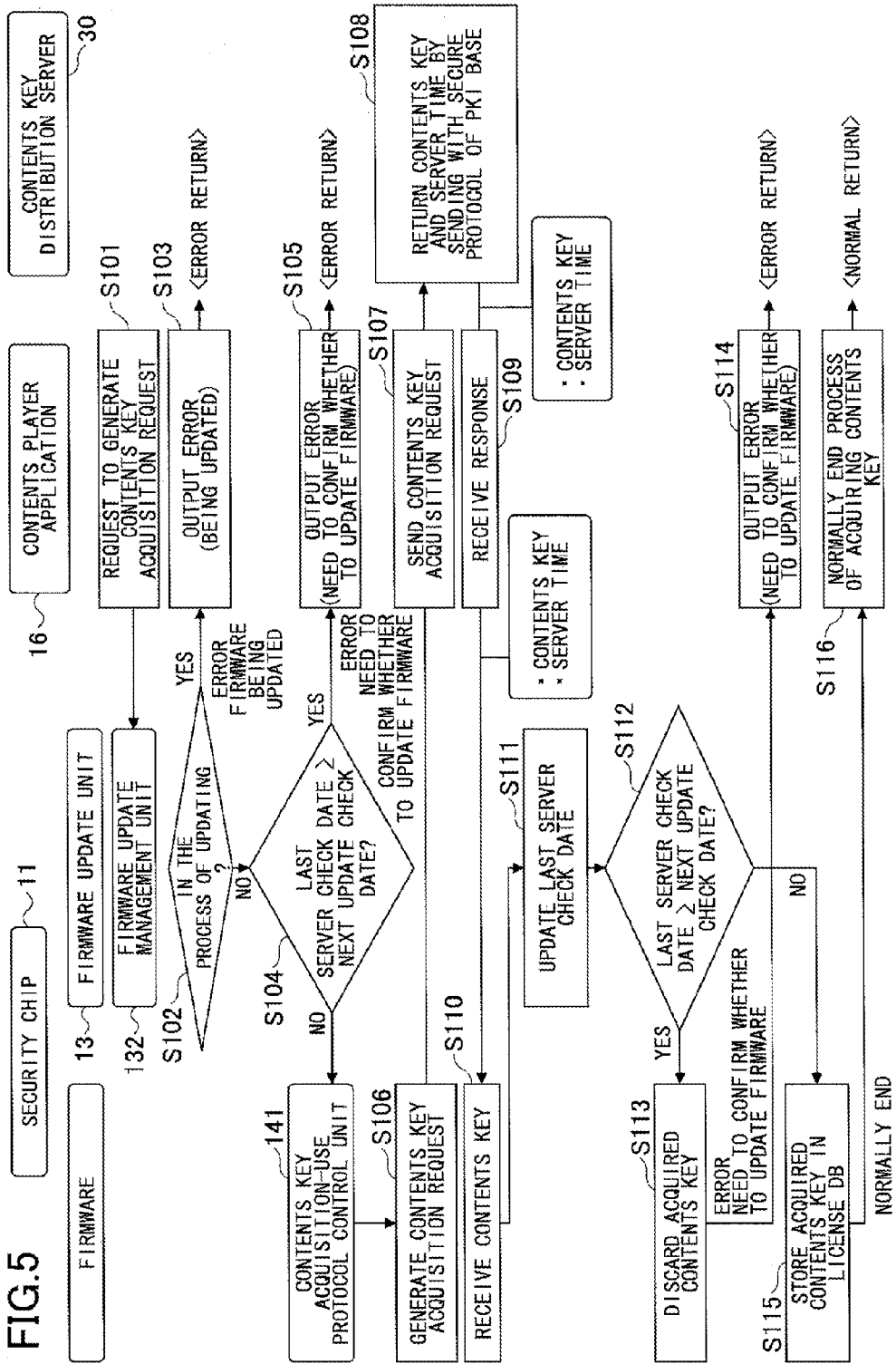
FIG. 5 is a flowchart for describing an example of processing procedures of a process of acquiring a contents key.

FIG. 5 is a flowchart for describing an example of processing procedures of a process of acquiring a contents key. For example, when a user operates the contents playing terminal 10 and an instruction to acquire a contents key for certain contents data is input to the contents player application 16, the process of FIG. 5 is started.

In step S101, the contents player application 16 inputs a request to generate a contents key acquisition request to the security chip 11 (S101). In this generation request, an identifier of the contents key that is the acquisition target is specified.

The inputting of a request from an application to the security chip 11 is performed via an interface (for example, a function) provided by the driver program of the security chip 11. Furthermore, the inputting of the generation request corresponds to an example of the inputting of a request to acquire a contents key to the security chip 11.

In response to the request to generate a contents key acquisition request, the update state determining unit 132a of the firmware update management unit 132 of the security chip 11 confirms the value of the firmware update state in the firmware management information 121 (S102). When the firmware update state is "in the process of updating (0x01)" (YES in S102), the update state determining unit 132a returns, to the contents player application 16, an error indicating that the process of updating the firmware data needs to be executed again. As described below, the firmware update state of "updating (0x01)" means that, for example, the process of updating the firmware data had been interrupted in the middle due to the power being shut off, etc. When this error is returned, for example, the contents player application 16 outputs the error on a display unit such as a liquid crystal panel of the contents playing terminal 10 (S103).

Meanwhile, when the firmware update state is not "in the process of updating (0x01)" (NO in S102), the update need determining unit 132b compares the last server check date with the next update check date in the firmware management information 121 (S104). When the last server check date has reached or passed the next update check date (that is to say, when last server check date≥next update check date) (YES in S104), the update need determining unit 132b returns, to the contents player application 16, an error indicating that the process of updating the firmware data needs to be executed (more precisely, confirming whether the firmware data needs to be updated). When the error is returned, for example, the contents player application 16 outputs the error on the display unit of the contents playing terminal 10 (S105).

Meanwhile, when the last server check date has not reached the next update check date (NO in S104), the firmware update management unit 132 requests the contents key acquisition protocol control unit 141 to generate a contents key acquisition request for a contents key. In this request, the identifier of the contents key that is the acquisition target is specified.

Next, the contents key acquisition request generating unit 141a of the contents key acquisition protocol control unit 141 generates a contents key acquisition request (step S106). The contents key acquisition request includes an identifier of the contents key that is the acquisition target, and is encrypted by a temporary shared key shared by the contents key acquisition protocol control unit 141 and the contents key distribution server 30 based on a PKI method. The generated contents key acquisition request is output to the contents player application 16.

Next, the contents player application 16 sends the generated contents key acquisition request to the contents key distribution server 30 (S107).

When the contents key acquisition request is received, the contents key distribution server 30 acquires the contents key corresponding to the identifier specified in the request. Furthermore, the contents key distribution server 30 acquires the present time (hereinafter, "server time") indicated by the clock in the self-device (contents key distribution server 30). Next, the contents key distribution server 30 generates a contents key acquisition response including the contents key and the server time, and returns the contents key acquisition response in a state encrypted by the temporary shared key (S108). When the contents key acquisition response is received, the contents player application 16 inputs the response in the security chip 11 (S109).

When the contents key acquisition response is received (S110), the contents key acquisition response receiving unit 141b of the security chip 11 specifies the server time included in the response and inquires the update need determining unit 132b of the firmware update management unit 132 whether the update process needs to be performed. The contents key acquisition response receiving unit 141b decrypts the contents key acquisition response with the temporary shared key.

The update need determining unit 132b updates the last server check date of the firmware management information 121 with the specified server time (S111). Next, the update need determining unit 132b compares the updated last server check date with the next update check date (S112). When the last server check date has reached or passed the next update check date (that is to say, when last server check date≥next update check date) (YES in S112), the update need determining unit 132b returns, to the contents key acquisition response receiving unit, an error indicating that the process of updating the firmware data needs to be executed (more precisely, confirming whether the firmware data needs to be updated).

The contents key acquisition response receiving unit 141b receives the error, and discards the above response (that is to say, the acquired contents key) (S113). Therefore, in this case, the contents key is not saved in the license DB 122. Next, the contents key acquisition response receiving unit 141b outputs the error to the contents player application 16. When the error is returned, for example, the contents player application 16 outputs the error on the display unit of the contents playing terminal 10 (S114).

Meanwhile, when the last server check date has not reached the next update check date (NO in S112), the contents key updating unit 141c records, in the license DB 122, the contents key included in the contents key acquisition response (S115). At this time, the contents key is recorded in the license DB 122 in association with the identifier specified at step S101. Next, the contents key updating unit 141c outputs, to the contents player application 16, a report that the process of acquiring the contents key has normally ended.

In response to the report that the process has normally ended, the contents player application 16 ends the process of acquiring the contents key (S116).

Figure 6:
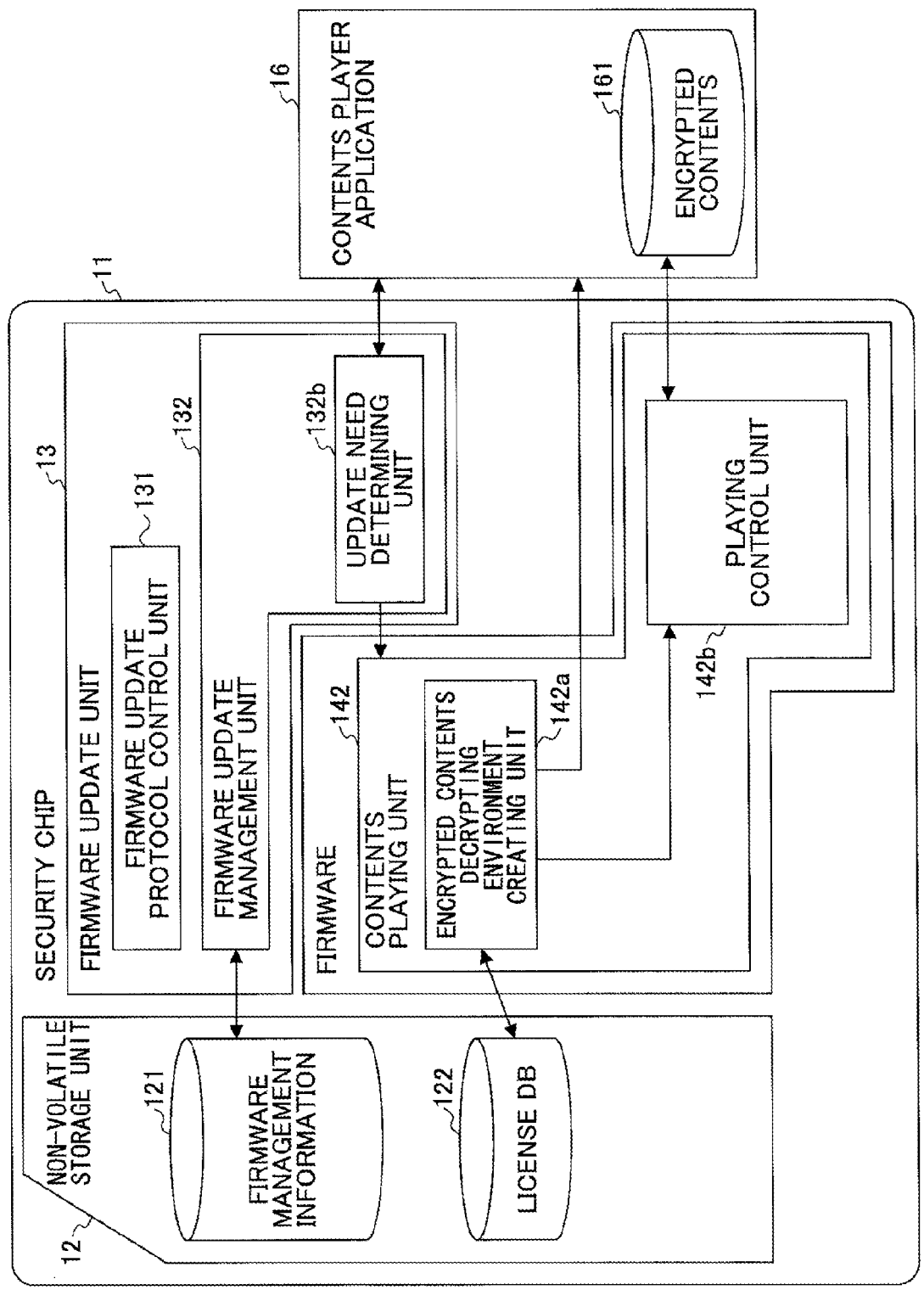
FIG. 6 illustrates an example of a functional configuration relevant to a process of playing contents data.

Next, a process of playing contents data is described. FIG. 6 illustrates an example of a functional configuration relevant to a process of playing contents data. The configuration elements relevant to the process of playing contents data illustrated in FIG. 6 are extracted from FIG. 2. For some of the configuration elements, the function configuration is illustrated in more detail. In FIG. 6, elements corresponding to those in FIG. 4 or FIG. 2 are denoted by the same reference numerals and descriptions thereof are omitted.

In FIG. 6, the contents playing unit 142 includes an encrypted contents decrypting environment creating unit 142a and a playing control unit 142b. The encrypted contents decrypting environment creating unit 142a creates, in the security chip 11, an environment for decrypting the contents data (encrypted contents 161) that has been encrypted and that is set as the playing target (encrypted contents decrypting environment). That is to say, the encrypted contents decrypting environment creating unit 142a sets the security chip 11 to be in a state where decryption of the encrypted contents 161 is executable.

The playing control unit 142*b* decrypts the encrypted contents 161 in the encrypted contents decrypting environment, and controls the playing of the decrypted contents data.

Figure 7:
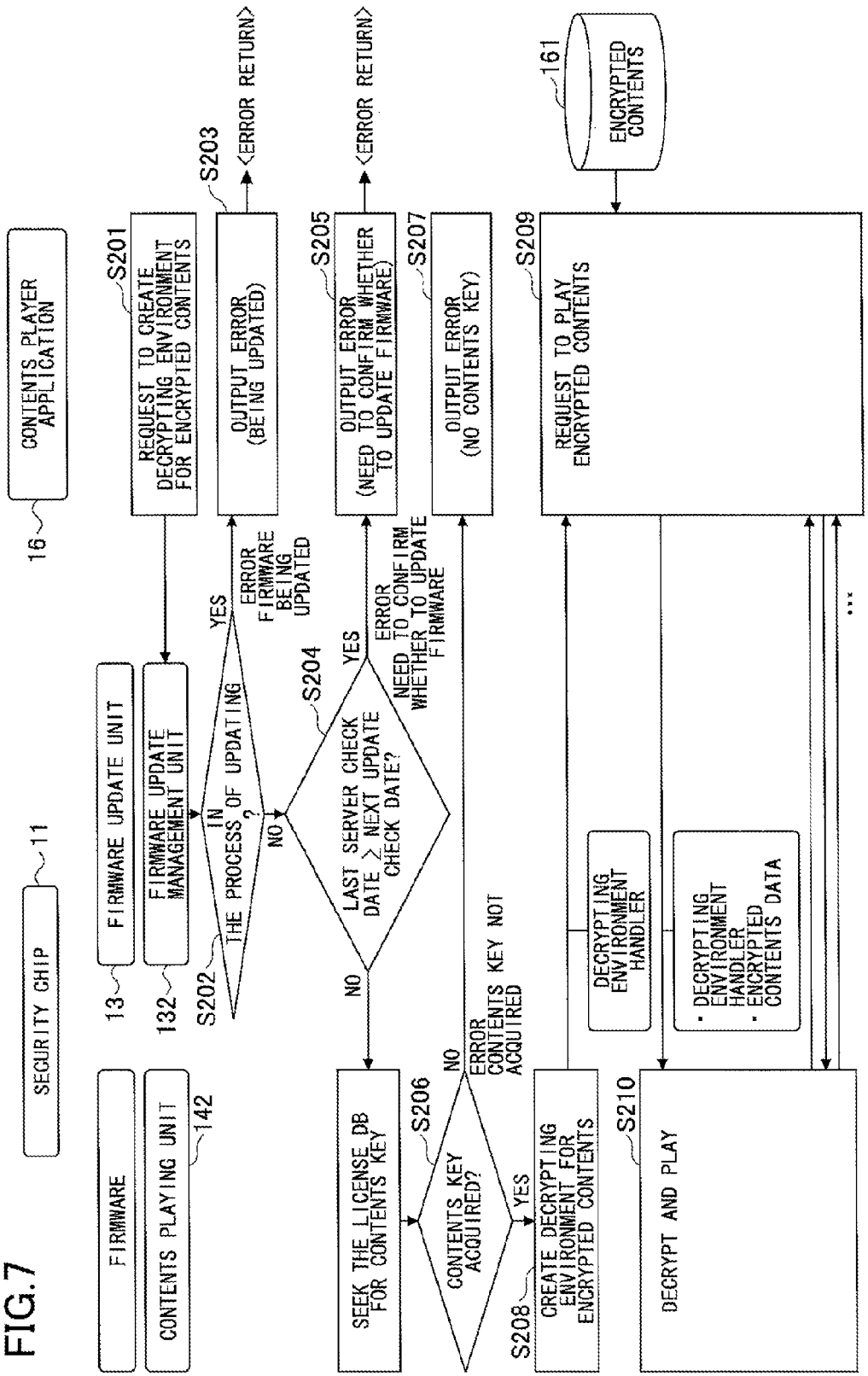
FIG. 7 is a flowchart for describing an example of processing procedures of a process of playing contents data.

FIG. 7 is a flowchart for describing an example of processing procedures of a process of playing contents data. For example, a user operates the contents playing terminal 10 and the encrypted contents 161 saved in the contents playing terminal 10 is selected. Next, when an instruction to play the selected encrypted contents 161 is input to the contents player application 16, the process of FIG. 7 is started.

In step S201, the contents player application 16 inputs, in the security chip 11, a request to create a decrypting environment for the encrypted contents 161 (S201). Creating a decrypting environment means making the security chip 11 in a state in which it is possible to decrypt the encrypted contents 161. In the request, the identifier of the contents key corresponding to the contents data that is set as the playing target is specified. The request to create a decrypting environment corresponds to an example of a request to decrypt the contents data that is made to the security chip 11.

Next, steps S202 through S205 are the same as steps S102 through S105 of FIG. 5, and therefore the descriptions thereof are omitted. That is to say, when the previous update state of the firmware data is "in the process of updating", an error is output. Furthermore, when the last server check date has reached or passed the next update check date (that is to say, when last server check date next update check date), an error is output.

When the last server check date has not reached the next update check date (NO in step S204), the firmware update management unit 132 requests the encrypted contents decrypting environment creating unit 142*a* to create an encrypted contents decrypting environment by specifying the identifier of the contents key. The encrypted contents decrypting environment creating unit 142*a* determines whether the contents key corresponding to the specified identifier is recorded in the license DB 122 (S206). That is to say, it is determined whether the contents key corresponding to the encrypted contents 161 that is the playing target has already been acquired.

When the corresponding contents key is not recorded in the license DB 122 (NO in S206), the encrypted contents decrypting environment creating unit 142*a* returns an error indicating that there is no contents key to the contents player application 16. When the error is returned, for example, the contents player application 16 outputs the error to a display unit of the contents playing terminal 10 (S207). In this case, the user may start the process of FIG. 10 again, after causing the contents playing terminal 10 to execute the process of acquiring a contents key described with reference to FIG. 7. Alternatively, the contents player application 16 may automatically start steps S107 and onward of FIG. 5.

Meanwhile, when the corresponding contents key is recorded in the license DB 122 (YES in step S206), the encrypted contents decrypting environment creating unit 142*a* creates an encrypted contents decrypting environment, and returns an identifier of the encrypted contents decrypting environment (decrypting environment handler) to the contents player application 16 (S208). In response to the encrypted contents decrypting environment being created, the contents key is loaded in the memory of the security chip 11 as a key used for decryption in the encrypted contents decrypting environment.

When the decrypting environment handler is returned, the contents player application 16 specifies the encrypted contents 161 that is the playing target and the decrypting environment handler, and inputs a request to play the encrypted contents 161 to the security chip 11 (S209).

The playing control unit 142*b* of the security chip 11 decrypts the encrypted contents 161 in the encrypted contents decrypting environment corresponding to the decrypting environment handler specified in the playing request, and causes the decrypted contents data to be played (S210). Decrypting the encrypted contents 161 in the encrypted contents decrypting environment corresponding to the decrypting environment handler means to decrypt the encrypted contents 161 by the contents key in the encrypted contents decrypting environment. Steps S209 and S210 are repeatedly executed in division units obtained by dividing the encrypted contents 161 into predetermined units. This is because the security chip 11 typically does not have enough memory capacity for decrypting the entire encrypted contents 161 at once.

Figure 8:
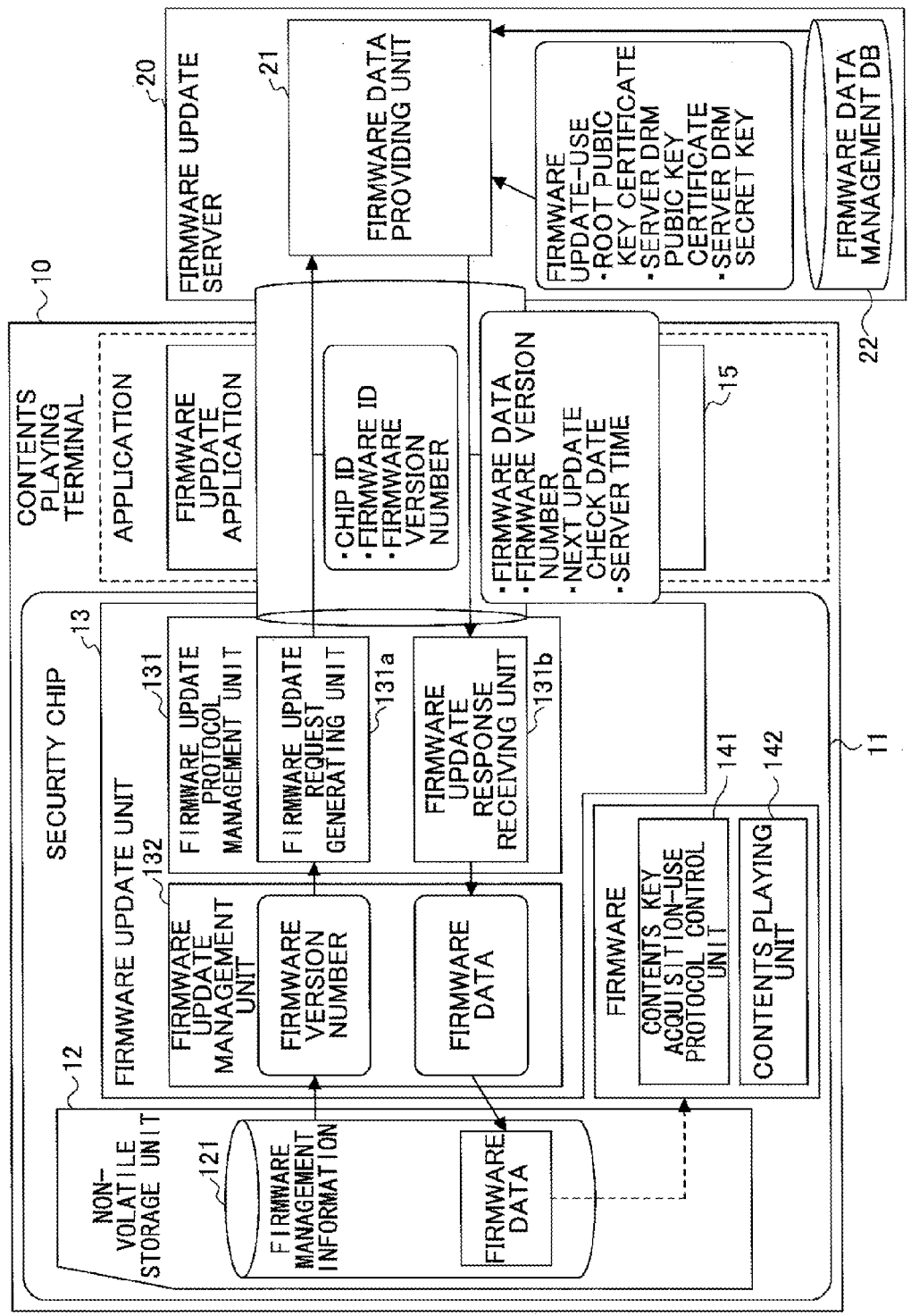
FIG. 8 illustrates an example of a functional configuration relevant to a process of updating firmware data.

Next, a description is given of the process of updating firmware data. FIG. 8 illustrates an example of a functional configuration relevant to a process of updating firmware data. The configuration elements relevant to the process of updating firmware data illustrated in FIG. 8 are extracted from FIG. 2. For some of the configuration elements, the function configuration is illustrated in more detail. In FIG. 8, elements corresponding to those in FIG. 6, 4, or 2 are denoted by the same reference numerals and descriptions thereof are omitted.

In FIG. 8, the firmware update protocol control unit 131 includes a firmware update request generating unit 131*a* and a firmware update response receiving unit 131*b*.

The firmware update request generating unit 131*a* generates request data for securely acquiring a contents key (for example, request data for updating firmware data) (hereinafter, "firmware update request"). For example, the firmware update request generating unit 131*a* shares a temporary shared key with a firmware data providing unit 21 of the firmware update server 20 by a PKI (Public Key Infrastructure) method. At this time, the firmware update request generating unit 131*a* uses a firmware update-use root public key certificate, a firmware update-use client public key certificate, and a firmware update-use client secret key included in the firmware management information 121. The sharing of the temporary shared key may be realized by using a known method such as EC-DH+EC-DSA+SHA or RSA-DH+RSA-DSA+SHA, etc. Furthermore, the firmware data providing unit 21 generates an electronic signature of firmware data with a secret key of the firmware update server 20, adds the electronic signature to the firmware data that has been encrypted with the above temporary shared key, and returns the firmware data. The electronic signature is managed as part ("electronic signature of firmware data") of the firmware management information 121. The electronic signature is generated by a method such as EC-DSA+SHA or RSA-DSA+SHA.

The firmware update response receiving unit 131*b* receives a response (firmware update response) returned from the firmware data providing unit 21 in response to the firmware update request. When the firmware update response includes firmware data, the existing firmware data is updated with the firmware data included in the firmware update response.

The firmware update server 20 includes the firmware data providing unit 21 and a firmware data management DB 22.

The firmware data management DB 22 is a database for storing management information relevant to the updating of firmware data.

FIG. 9 illustrates an example of a configuration of a firmware data management DB. Each record in the firmware data management DB 22 includes a chip ID, a firmware ID, a latest firmware version number, a next update check date, a firmware data length, and firmware data, etc.

The chip ID is identification information for uniquely identifying the security chip 11. The firmware ID is the firmware ID of the firmware data that is the target. There may be plural versions for firmware data relevant to the same firmware ID. The latest firmware version number is the latest version number of the firmware identified by the firmware ID. The next update check date is the next update check date most recently returned to the security chip 11 (contents playing terminal 10) corresponding to the chip ID. The firmware data length is the data size (number of bytes) of the firmware data of the latest version. The firmware data is the firmware data of the latest version.

Referring back to FIG. 8, the firmware data providing unit 21 returns a firmware update response in response to a firmware update request. In the firmware update response, firmware data, etc., is included according to need. Even if firmware data need not be returned, the next update check date and the server date of the firmware update server 20 are included in the firmware update response.

FIG. 10 is a flowchart for describing an example of processing procedures of a process of updating firmware data. For example, at the time of a process of acquiring a contents key or at the time of a process of playing contents, when an error indicating that a process of updating firmware data is needed, the user inputs an instruction to update firmware data in the firmware update application 15. In response to the update instruction, the process of FIG. 10 is started.

In step S301, the firmware update application 15 inputs a request to generate a firmware update request in the security chip 11. Next, the firmware update request generating unit 131a of the security chip 11 generates a firmware update request including a chip ID of the security chip 11, and a firmware ID and a firmware version number included in the firmware management information 121 (S302). The firmware ID and the firmware version number are acquired from the firmware management information 121 via the firmware update management unit 132. The firmware update request is at least partially encrypted with the temporary shared key. The firmware update request generating unit 131a returns the generated firmware update request to the firmware update application 15.

Next, the firmware update application 15 sends the firmware update to the firmware update server 20 (S303). The firmware data providing unit 21 of the firmware update server 20 searches the firmware data management DB 22 for a record corresponding to the chip ID and the firmware ID specified in the firmware update request (S304). Next, the firmware management information 121 compares the latest firmware version number of the search-found record (hereinafter, "current record") with the firmware version number included in the firmware update request (hereinafter, "present firmware version number") (S305).

When the present firmware version number and the latest firmware version number match (YES in S305), the firmware data providing unit 21 returns a firmware update response (hereinafter, "update unneeded response") that does not include firmware data (S306). However, the update unneeded response includes the server time (present time) of the firmware update server 20 and the next update check date, etc.

Meanwhile, when the present firmware version number is older than the latest firmware version number (NO in S305), the firmware data providing unit 21 uses a firmware update-use server DRM secret key for the firmware update server 20 to generate an electronic signature of the firmware data of the current record (S307). Next, the firmware data providing unit 21 generates a firmware data update response including firmware data, and returns the firmware update response (S308). The firmware update response includes the latest firmware version number, the firmware data, and the next update check date included in the current record, a server time of the firmware update server 20, and the generated electric signature. Furthermore, at least part of the firmware update response is encrypted with a temporary shared key.

In step S306 or S308, the value of the next update check date to be included in the response may be appropriately determined according to the operation. For example, the next update check date may be a predetermined time period from the present time. The next update check date included in the response is recorded in the current record of the firmware data management DB 22. Furthermore, the update timing of the firmware data may also be appropriately determined according to the operation.

When an update unneeded response or a firmware update response returned at step S306 or S308 is received (S311 or S312), the firmware update application 15 of the firmware update server 20 inputs the response in the security chip 11.

When the response is received (S313), the firmware update response receiving unit 131b of the security chip 11 causes the process to be branched according to the contents of the response (S314).

That is to say, when the response is an update unneeded response (NO in step S314), the firmware update response receiving unit 131b determines that the update of firmware data is not needed, specifies the next update check date and the server time, etc., included in the firmware update response, and calls the firmware update management unit 132. The firmware update management unit 132 updates the firmware management information 121 by this information (S315). Specifically, the next update check date in the firmware management information 121 is updated by the specified next update check date. Furthermore, the last server check date in the firmware management information 121 is updated by the specified server time.

Next, when the firmware update state in the firmware management information 121 is "in the process of updating" (YES in S316), the firmware update management unit 132 changes the firmware update state to "update completed", loads the firmware data again in the non-volatile storage unit 12, and ends the update process (S317). As a result, the firmware becomes executable.

At step S316, when the firmware update state of the firmware management information 121 is "in the process of updating", it means that the previous update process had been interrupted.

Meanwhile, when the received response is a firmware update response including firmware data (YES in S314), the firmware update response receiving unit 131b checks whether the firmware data included in the firmware update response has been altered (S318). The electronic signature included in the firmware update response is used for checking whether the firmware data has been altered.

When an alteration in the firmware data has been detected (YES in S318), the firmware update response receiving unit 131b outputs an error indicating that the firmware data has been altered to the firmware update application 15. In response to the error, for example, the contents update application outputs the error on a display unit of the contents playing terminal 10 (S319).

When an alteration on the firmware data is not detected (NO in S318), the firmware update response receiving unit 131b requests the firmware update management unit 132 to update the firmware data. In this request, data included in the firmware update response is specified.

In response to the request, the firmware update management unit 132 updates the firmware data, etc., according to the following procedures (S320).
(1) The firmware update state of the firmware management information 121 is changed to "in the process of updating".
(2) The firmware data and the electronic signature of the firmware management information 121 are updated with the firmware data and the electronic signature included in the specified data.
(3) The firmware version number of the firmware management information 121 is updated with the firmware version number included in the specified data.
(4) The value of the next update check date of the firmware management information 121 is updated with the next update check date included in the specified data.
(5) The value of the last server check date of the firmware management information 121 is updated with the server time included in the specified data.
(6) The firmware update state of the firmware management information 121 is changed to "update completed".

As described above, the firmware update state of the firmware management information 121 is changed back to "update completed" when all of the information, which needs to be updated as the firmware data is updated, has been updated. Thus, if the process is interrupted in the middle due to the power being shut off, etc. during (1) through (5) above, the firmware update state remains as "in the process of updating".

Next, the firmware update management unit 132 loads the updated firmware data in the memory in the security chip 11, so that the firmware becomes executable (S321). The method of serializing the timing of loading the firmware data and the execution of the firmware may be performed according to known technology.

Incidentally, in FIG. 10, the firmware update request and the response to this request are illustrated as being realized by communicating once (one reciprocation). However, more precisely, the firmware update request and the response to this request are realized by communicating plural times.

For example, first, a request to open secure communication (connection) (secure connection open request) is generated by the update state determining unit 132a, and the secure connection open request is sent from the firmware update application 15 to the firmware update server 20.

FIG. 11 illustrates an example of the configuration of a secure connection open request. In FIG. 11, the secure connection open request includes items such as RequestID, Version, ChipID, RandomNumber, CertificateSize, and Certificate.

RequestID indicates the type of request. Therefore, as the RequestID, a value indicating the secure connection open request is specified. Version is the version of a protocol. ChipID is the ID of the security chip 11 (that is to say, the chip ID described above). RandomNumber is a random number of the client side (on the side of the security chip 11) generated for each connection in order to prevent (or detect) masquerading. A connection is a series of communication units opened in response to an open request and closed in response to a close request. CertificateSize is the data size of a certificate. The certificate is a firmware update-use client public key certificate, which is acquired from the firmware management information 121.

In response to a secure connection open request, the firmware data providing unit 21 of the firmware update server 20 generates a secure connection open response, and returns the secure connection open response.

FIG. 12 illustrates an example of a configuration of a secure connection open response. In FIG. 12, the secure connection open response includes items such as RequestID, Version, RandomNumber, EC-DHPhave1Value, Signature, CertificateSize, and Certificate.

As RequestID, a value indicating the secure connection open response is specified. Version is the version of the protocol. RandomNumber is a random number of the server side (side of firmware update server 20). EC-DHPhave1Value is a temporary public key created by the firmware data providing unit 21 of the firmware update server 20. Signature is a value obtained combining the value of the RandomNumber included in the secure connection open response and the value of EC-DHPhave1Value that is the fourth item, and signing this combined value with a firmware update-use server secret key. CertificateSize is the data size of the Certificate. Certificate is a firmware update-use server public key, which is saved in the firmware update server 20 in advance.

When a secure connection is opened, the firmware update request is generated and sent by the procedures described with reference to FIG. 7.

FIG. 13 illustrates an example of a configuration of a firmware update request. The firmware update request includes items such as RequestID, Version, ChipID, EC-DHPhave1Value, Signature, ParameterSize, ChipID, FirmID, and FirmVersion. RequestID, Version, and ChipID are obvious from the above description and therefore descriptions thereof are omitted.

EC-DHPhave1Value is a temporary public key created by the firmware update request generating unit 131a. Signature is a value obtained combining the value of the RandomNumber included in the secure connection open response and the value of EC-DHPhave1Value, and signing this combined value with a firmware update-use client secret key. ParameterSize is the data size of the parameters of the firmware update request. In the present embodiment, these parameters are ChipID, FirmID, and FirmVersion, which are the seventh item through the ninth item. ChipID is the chip ID of the security chip 11. FirmID is the firmware ID included in the firmware management information 121. FirmVersion is the firmware version number included in the firmware management information 121.

The firmware update request generating unit 131a creates a temporary shared key (AES 128 bits) by EC-DH (prime field 224 bit key), by using the temporary secret key created by itself and EC-DHPhave1Value (temporary public key) included in the fourth item of the secure connection open response. The parameters of the firmware update request (seventh item through ninth item) are encrypted by this temporary public key.

In response to the firmware update request, the firmware data providing unit 21 of the firmware update server 20 generates a firmware update response and returns the firmware update response.

FIG. 14 illustrates an example of a configuration of a firmware update response. The firmware update response includes items such as RequestID, Version, ParameterSize, NextCheckDateTime, ServerTime, FirmVersion, FirmData- Size, Firmdata, and Digest. RequestID and Version are obvious from the above description and therefore descriptions thereof are omitted.

ParameterSize is the data size of the parameters (fourth item through the ninth item) of the firmware update response. NextCheckDateTime is the next update check date. ServerTime is the server time of the firmware update server 20. FirmVersion is the firmware version number of the firmware data included in the eighth item. When the firmware data does not need to be updated (that is to say, when firmware data is not returned), the value of FirmVersion is invalid. FirmDataSize is the data size of the firmware data included in the eighth item. When the firmware data does not need to be updated, the value of FirmDataSize is zero. FirmData is the latest firmware data. When the firmware data does not need to be updated, this item is not included in the firmware update response. Digest is a message digest of SHA-256 from the first item through the eighth item. However, when the firmware data does not need to be updated, Digest is the message digest from the first item through the seventh item.

The firmware data providing unit 21 creates a temporary shared key (AES 128 bits) by EC-DH (prime field 224 bit key), by using the temporary secret key created by itself and EC-DHPhave1Value (temporary public key) included in the fourth item of the firmware update request. The parameters of the firmware update response (fourth item through ninth item) are encrypted by this temporary public key.

When closing a secure connection, a request to close the connection (secure connection close request) is generated by the firmware update request generating unit 131*a*, and the secure connection close request is sent from the firmware update application 15 to the firmware update server 20.

FIG. 15 illustrates an example of a configuration of a secure connection close request. In FIG. 15, the secure connection close request includes items such as RequestID, Version, ChipID, ParameterSize, and Digest. RequestID, Version, and ChipID are obvious from the above description and therefore descriptions thereof are omitted.

ParameterSize is the data size of Digest of the fifth item. Digest is a message digest of SHA-256 of the first item through the fourth item. Digest is encrypted by the temporary shared key created by the firmware update request generating unit 131*a*.

In response to the secure connection close request, the firmware data providing unit 21 of the firmware update server 20 generates a secure connection close response, and returns the secure connection close response.

FIG. 16 illustrates an example of a configuration of a secure connection close response. In FIG. 16, the secure connection close response includes items such as RequestID, Version, ParameterSize, ReturnCode, and Digest. RequestID and Version are obvious from the above description and therefore descriptions thereof are omitted.

ParameterSize is the data size of the fourth item and the fifth item. ReturnCode is a return code. Digest is a message digest of SHA-256 of the first item through the fourth item. The fourth item and the fifth item are encrypted by a temporary shared key created by the firmware data providing unit 21.

Next, a description is given of an example of the hardware configuration of the contents playing terminal 10 and the relationship between the respective units illustrated in FIG. 2, etc., and the hardware.

Figure 17:
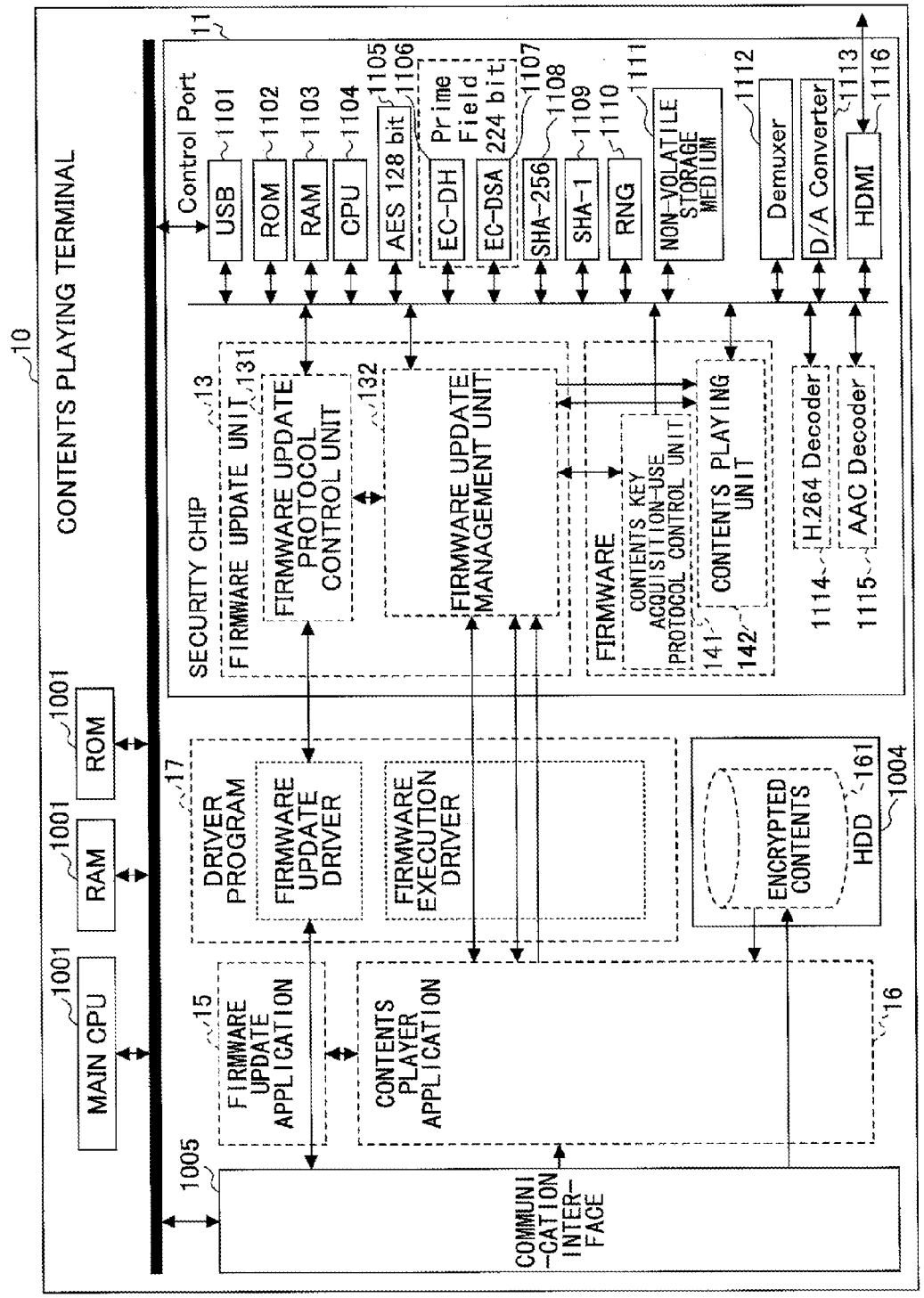
FIG. 17 illustrates an example of a hardware configuration, etc., of a contents playing terminal according to an embodiment of the present invention.

FIG. 17 illustrates an example of a hardware configuration, etc., of a contents playing terminal according to an embodiment of the present invention. In FIG. 17, elements corresponding to those of FIG. 2 are denoted by the same reference numerals, and descriptions thereof are omitted. In FIG. 17, in addition to the security chip 11, a main CPU 1001, a RAM 1002, a ROM 1003, a HDD 1004, and a communication interface 1005, etc., are illustrated as examples of hardware components constituting the contents playing terminal.

The main CPU 1001 realizes the functions of the firmware update application 15, the contents player application 16, and a driver program 17, etc. The driver program 17 is a driver program for providing a software interface for the security chip 11. The RAM 1002 is used as an area for loading programs when executing the firmware update application 15, the contents player application 16, and the driver program 17, etc. The ROM 1003 stores the firmware update application 15, the contents player application 16, and the driver program 17, etc. The HDD 1004 is used as an area for saving the encrypted contents 161, etc. According to the properties of the contents playing terminal 10, other non-volatile storage media may be used instead of the HDD 1004 (Hard Disk Drive). The non-volatile storage medium may be removable like a memory card. The communication interface 1005 is hardware for realizing communication via a network such as LAN (wired or wireless) or a mobile communication network. The firmware update application 15 and the contents player application 16, etc., communicate with the firmware update server 20 or the contents key distribution server 30, etc., with the use of the communication interface 1005.

The security chip 11 includes hardware components such as a USB 1101, a ROM 1102, a RAM 1103, a CPU 1104, an AES 128 bit chip 1105, an EC-DH chip 1106, an EC-DSA chip 1107, a SHA-256 chip 1108, SHA-1 chip 1109, an RNG chip 1110, a non-volatile storage medium 1111, a Demuxer 1112, a D/A Converter 1113, a H.264 Decoder 1114, an AAC Decoder 1115, and a HDMI 1116.

The USB 1101 is an interface for USB-connecting a bus to which the main CPU 1001, etc., is connected and the security chip 11. The ROM 1102 stores a program, etc., for causing the CPU 1104 to function as the firmware update unit 13 (hereinafter, "firmware update program"). The RAM 1103 is used as a load area when executing the firmware update program and firmware, etc. The CPU 1104 functions as the firmware update unit 13, the contents key acquisition protocol control unit 141, and the contents playing unit 142 based on the firmware update program or firmware, etc.

The AES 128 bit chip 1105, the EC-DH chip 1106, and the EC-DSA chip 1107 are used for the encrypting process. The SHA-256 chip 1108 and the SHA-1 chip 1109 are used for generating a message digest. The RNG chip 1110 generates random numbers.

The non-volatile storage medium 1111 functions as the non-volatile storage unit 12 illustrated in FIG. 2, etc. Therefore, the firmware management information 121 and firmware data, etc., are recorded in the non-volatile storage medium 1111.

The Demuxer 1112, the D/A Converter 1113, the H.264 Decoder 1114, and the AAC Decoder 1115, etc., are used for playing the decrypted contents data. However, these elements may be disposed outside the security chip 11.

The HDMI 1116 is an interface complying with so called HDMI 1116 (High-Definition Multimedia Interface).

As illustrated in FIGS. 5, 7, 10, and 17, when the application uses the contents key acquisition protocol control unit 141 and the contents playing unit 142, etc., that are firmware, call out is performed via the firmware update unit 13. Before calling the contents key acquisition protocol control unit 141 or the contents playing unit 142, the firmware update management unit 132 confirms whether the firmware data is in the process of being updated (that is to say, whether the firmware update state in the firmware management information 121 is "in the process of updating"). When the firmware data is in the process of being updated, the firmware update unit 13 returns an error to the application.

As described above, with the contents playing terminal 10 according to the present embodiment, the timing of the process of updating firmware data (confirmation of whether update is needed) is determined based on the server time acquired from outside the contents playing terminal 10 (in the present embodiment, from the firmware update server 20, the contents key distribution server 30). That is to say, the time indicated by the clock provided in the contents playing terminal 10 is not used. Therefore, it is possible to prevent the timing from being invalidated, etc., by adjusting the clock provided in the contents playing terminal 10.

Furthermore, the server time is encrypted and acquired by secure communication. Therefore, the server time is appropriately prevented from being altered in the distribution path of the server time.

Furthermore, the need of executing the update process on the firmware data (update confirmation) is determined in the security chip 11, and the actual update is performed by the firmware update server 20. Therefore, it is possible to appropriately prevent the update processes on the firmware data from being avoided by altering the application program.

Furthermore, when a state where an update process on the firmware data is not executed continues more than a predetermined time period, the downloading of a contents key and the playing of contents data are rejected by the security chip 11. Therefore, the user is forced to execute an update process (confirm whether update is needed) on the firmware data. In the present embodiment, unless the contents playing terminal 10 communicates with the firmware update server 20 or the contents key distribution server 30, the last server check date is not updated. However, even in such a case, the range that is possible to be played is limited to the contents data for which a contents key has already been acquired. That is to say, in order to play new contents data, a corresponding contents key has to be downloaded. By starting a download operation, the last server check date is updated, and according to the result of comparing this updated last server check date with the next update check date, the downloading may be rejected.

Furthermore, the server time used for updating the last server check date is encrypted together with the contents key and transferred to the contents playing terminal 10. That is to say, the server time is included in the contents key acquisition response including the contents key, and is transferred to the contents playing terminal 10. Therefore, if the transfer of the server time is hampered, the contents key is not downloaded to the contents playing terminal 10. That is to say, in order for the contents playing terminal 10 to receive a contents key, a response including the contents key is to be input to the security chip 11. Therefore, hampering of the reception of a server time (that is to say, hampering of the updating of the last server check date) is appropriately mitigated.

Furthermore, because the firmware update state is managed, the security chip 11 may appropriately detect that the updating of the firmware has not been completed (interrupted). When it is detected that the updating of the firmware has not been completed, the security chip 11 rejects the downloading of a contents key and the playing of contents data, etc. Therefore, the probability of appropriately completing the updating of firmware (the probability of not fraudulently interrupting the updating) is enhanced.

When updating the firmware, after updating the entity of the firmware, the firmware version number is updated, and finally the firmware update state is updated. That is to say, it is determined whether the updating is needed based on the firmware version number, and the firmware version number is updated after the firmware data is updated. Therefore, when updating the firmware data again, the probability of updating the firmware data to the newest firmware data is enhanced.

The present invention is not limited to the specific embodiments described herein, and variations and modifications may be made without departing from the scope of the present invention.

According to an embodiment of the present invention, a contents data playing device, an update management method, and an update management program are provided, by which the coercive force with respect to the updating of the firmware is enhanced.

According to the above detailed descriptions, the characteristics and the advantages of the embodiments are made clear. The scope of the claims may extend to the characteristics and the advantages of the embodiments, without departing from the spirit and the scope of the present invention. Furthermore, those skilled in the art may easily devise modifications and variations, and the scope of the embodiments having inventiveness is not limited to the above, and appropriate modifications and equivalents may be made within the scope of the disclosed embodiments.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A security chip used in a contents data playing device, the security chip comprising:
   at least one hardware processor; and
   a memory configured to store firmware data including a firmware update program and a firmware program;
   the firmware update program causes the processor to:
   determine whether an update process has been completed on the firmware data when a contents key acquisition instruction or a contents data playing instruction is input to the contents data playing device,
   initiate a determination process to determine whether the firmware data needs to be updated based on a comparison between expiration information set in the firmware data and time information received via a network, the time information being encrypted together with a contents key;
   decrypt the encrypted time information and confirm that the time information has not been hampered;
   in response to a verification that an update process has been completed and a predetermined period has elapsed according to the comparison, determine that the updating of the firmware data is needed;

reject the contents key acquisition instruction or the contents data playing instruction when the firmware data needs to be updated; and in response to the verification that an update process has been completed and a predetermined period has not elapsed according to the comparison, determine that the updating of the firmware data is not needed;

acquire, via the network, the contents key for decrypting contents data, and decrypt the contents data by using the contents key.

2. The security chip according to claim 1, wherein the firmware update program further causes the processor to record, in an update state storage unit, update state information indicating a state of the update process in the update process performed on the firmware data, and refer to the update state information in response to the request input to the security chip to acquire the contents key or to decrypt the contents data, and reject the request when the update state information indicates that the update process has not been completed.

3. The security chip according to claim 1, wherein the firmware update program further causes the processor to determine whether the firmware data needs to be updated based on the comparison between the expiration information set in the firmware data and the time information received via the network when the update process has been completed on the firmware data.

4. A method of update management executed by a security chip included in a contents data playing device, the method comprising:

determining whether an update process has been completed on firmware data when a contents key acquisition instruction or a contents data displaying instruction is input to the contents data displaying device;

initiating a determination process to determine whether the firmware data needs to be updated based on a comparison between expiration information set in the firmware data and time information received via a network, the time information being encrypted together with a contents key;

decrypting the encrypted time information and confirming that the time information has not been hampered;

in response to a verification that an update process has been completed and a predetermined period has elapsed according to the comparison, determining that the updating of the firmware data is needed;

rejecting the contents key acquisition instruction or the contents data displaying instruction when the firmware data needs to be updated; and in response to the verification that an update process has been completed and a predetermined period has not elapsed according to the comparison, determining that the updating of the firmware data is not needed;

acquiring, via the network, the contents key for decrypting contents data; and decrypting the contents data by using the contents key.

5. The method according to claim 4, further comprising:

recording, by the security chip, update state information in an update state storage unit, the update state information indicating a state of the update process in the update process performed on the firmware data, wherein the recording includes referring to the update state information in response to the request input to the security chip to acquire the contents key or to decrypt the contents data, and rejecting the request when the update state information indicates that the update process has not been completed.

6. The method according to claim 4, wherein whether the firmware data needs to be updated based on the comparison between the expiration information set in the firmware data and the time information received via the network is determined when the update process has been completed on the firmware data.

7. A non-transitory computer-readable recording medium storing a program for executing update management by a security chip included in a contents data playing device, the program causes a computer to execute a process comprising:

determining whether an update process has been completed on firmware data when a contents key acquisition instruction or a contents data displaying instruction is input to the contents data displaying device;

initiating a determination process to determine whether the firmware data needs to be updated based on a comparison between expiration information set in the firmware data and time information received via a network, the time information being encrypted together with a contents key;

decrypting the encrypted time information and confirming that the time information has not been hampered;

in response to a verification that an update process has been completed and a predetermined period has elapsed according to the comparison, determining that the updating of the firmware data is needed;

rejecting the contents key acquisition instruction or the contents data displaying instruction when the firmware data needs to be updated; and in response to the verification that an update process has been completed and a predetermined period has not elapsed according to the comparison, determining that the updating of the firmware data is not needed;

acquiring, via the network, the contents key for decrypting contents data; and decrypting the contents data by using the contents key.

8. The non-transitory computer-readable recording medium according to claim 7, the process further comprising:

recording, by the security chip, update state information in an update state storage unit, the update state information indicating a state of the update process in the update process performed on the firmware data, wherein the recording includes referring to the update state information in response to the request input to the security chip to acquire the contents key or to decrypt the contents data, and rejecting the request when the update state information indicates that the update process has not been completed.

9. The non-transitory computer-readable recording medium according to claim 7, wherein whether the firmware data needs to be updated based on the comparison between the expiration information set in the firmware data and the time information received via the network is determined when the update process has been completed on the firmware data.

* * * * *